United States Patent
Lantsman

[19]

[11] Patent Number: 6,027,068
[45] Date of Patent: Feb. 22, 2000

[54] DISPENSER FOR SOLDER AND OTHER DUCTILE STRAND MATERIALS

[75] Inventor: Aleksandr Lantsman, Wheling, Ill.

[73] Assignee: New Millennium Products, Inc., Trenton, N.J.

[21] Appl. No.: 09/044,664

[22] Filed: Mar. 19, 1998

[51] Int. Cl.[7] ................................................. B65H 16/10
[52] U.S. Cl. ................................. 242/564.4; 242/588.6; 226/190; 226/193; 226/187; 228/41
[58] Field of Search ............................. 242/564.4, 564.1, 242/564.2, 588.6; 226/193, 190, 127, 187, 188, 53; 228/244, 41, 52

[56] References Cited

U.S. PATENT DOCUMENTS

| | | |
|---|---|---|
| D. 266,980 | 11/1982 | Fortune . |
| D. 323,531 | 1/1992 | Fortune . |
| 878,622 | 2/1908 | Ferner . |
| 1,182,299 | 5/1916 | Morton . |
| 1,929,666 | 10/1933 | Williams . |
| 2,372,859 | 4/1945 | Sparks . |
| 2,432,428 | 12/1947 | Lang ............................ 228/52 |
| 2,809,748 | 10/1957 | Barnaby . |
| 3,016,451 | 1/1962 | Cornell, Jr. ................. 226/190 X |
| 4,176,778 | 12/1979 | Fortune . |
| 4,199,096 | 4/1980 | Keefe et al. .................. 228/52 |
| 4,380,433 | 4/1983 | Ellman et al. ............... 226/127 X |
| 4,408,730 | 10/1983 | Shend'ge et al. . |
| 4,434,925 | 3/1984 | Jacobs ........................ 226/127 X |
| 4,493,449 | 1/1985 | Kleiman . |
| 4,690,318 | 9/1987 | Hite . |
| 4,944,464 | 7/1990 | Zelenka ....................... 242/564.4 |
| 5,415,338 | 5/1995 | Wilkes ......................... 228/244 |
| 5,579,669 | 12/1996 | Kind et al. ................. 242/588.6 X |
| 5,782,394 | 7/1998 | Langley ...................... 226/187 |
| 5,813,591 | 9/1998 | Quinn et al. ................ 228/41 |

FOREIGN PATENT DOCUMENTS

| | | | |
|---|---|---|---|
| 209384 | 4/1924 | United Kingdom ............... 228/41 |
| 279700 | 11/1927 | United Kingdom ............... 226/127 |
| 612034 | 11/1948 | United Kingdom ............... 228/52 |

*Primary Examiner*—Donald P. Walsh
*Assistant Examiner*—Minh-Chau Pham
*Attorney, Agent, or Firm*—Caesar, Rivise, Bernstein, Cohen & Pokotilow, Ltd.

[57] ABSTRACT

A dispenser for strand materials, such as solder, is provided. Also provided is a method for dispensing strand materials using the dispenser. The dispenser is hand-held, and includes a gear, which ratchetably rotates to selectively advance the strand material through the dispenser. The gear also creates indentations on the strand material, providing gauged lengths of strand material. The dispenser can be adapted to be refillable with standard size spools of solder, or can be adapted to feed solder from an external spool.

23 Claims, 6 Drawing Sheets

DISPENSER FOR SOLDER AND OTHER DUCTILE STRAND MATERIALS

FIELD OF THE INVENTION

This invention relates to dispensers for ductile strand materials, and in particular, to hand-held dispensers for soldering wire.

BACKGROUND OF THE INVENTION

Flexible strand materials, such as solder, are typically packaged and dispensed from spools on which they are coiled. The material can be dispensed by simply unwinding it from the spool. However, this simple approach to dispensing strand materials is not well-suited to a variety of applications.

A number of patents disclose dispensing strand material from devices having a variety of useful features, but still require the user to grasp the strand material with a free hand and pull the strand material from the device as desired.

For example, U.S. Pat. No. 878,622 to Ferner discloses a combined dispenser for solder and soldering flux. Solder is wound around the body of the device, which is hollow for containing flux. The user apparently grasps and pulls the solder to unwind it as desired. U.S. Pat. No. 1,182,299 to Morton discloses a combined dispenser for solder and rosin, wherein the dispenser is cylindrical with rosin stored within it and solder wound around it. The user apparently grasps the solder to unwind it as desired. U.S. Pat. No. 2,372,859 to Sparks discloses a solder dispenser or package in which a length of solder is wound around a linear portion of the solder which extends beyond the coil to form a coiled body of solder. The user grasps and pulls the solder to unwind it as desired. U.S. Pat. No. 2,809,748 to Barnaby discloses a dispensing container comprising a tube within another tube, with a supply of solder wound around the smaller tube in the space between the two tubes. The solder is withdrawn from the dispensing head by grasping and pulling the solder. U.S. Pat. No. 4,690,318 to Hite discloses a head-mounted solder dispenser, wherein a solder spool is mounted on a headband. Solder is manually pulled by the user from the spool. U.S. Pat. No. 4,176,778 to Fortune discloses a soldering tool holder which can include a solder spool for dispensing solder. The user apparently grasps and pulls the solder to unwind it as desired. U.S. Pat. No. 4,408,730 to Shend'ge et al. discloses a portable wire dispenser particularly suitable for dispensing solder. The dispenser comprises a cylindrical body in which a helical coil of solder is held. The user apparently grasps and pulls the solder to unwind it as desired.

Certain strand material applications, such as soldering, are made more efficient by the use of strand material dispensers which can be operated with one hand. U.S. Pat. No. 1,929,666 to Williams discloses a device for dispensing strand material with one hand rather than with two hands. The device is a self-feeding solder pencil which feeds a straight length of solder when thrust downward by the user. However, this device is not well-suited for applying solder where precisely measured amounts of solder are necessary, or there is little space in which to work.

Other strand material dispensing devices are disclosed in U.S. Pat. No. 4,493,449 to Kleiman, which discloses a soldering tool for a robot, wherein the solder is fed from a solder spool by motorized rubber feed wheels; U.S. Pat. No. Des. 266,980 to Fortune, which shows a combination solder and strand material dispenser; and U.S. Pat. No. Des. 323,531 to Fortune, which shows an improved spool for strand materials.

Although a variety of strand dispensers have been proposed in the art, there still exists a need for a strand dispenser which can dispense strand material from standardized coils in precise amounts without tangling the material, and which is adapted to be held and operated by a single human hand.

All references cited herein are incorporated herein by reference in their entireties.

SUMMARY OF THE INVENTION

The invention addresses at least the foregoing deficiencies of the prior art by providing a strand material dispenser comprising:

a gear having strand material indentation means and pawl ratcheting means;

a grooved surface having a groove opposing the strand material indentation means, said groove being adapted to receive the strand material;

a pawl ratchetably opposing the pawl ratcheting means;

a strand material supply source; and a housing at least partially enclosing the gear, the grooved surface, the pawl and the strand material supply source, wherein the housing is adapted to be held in a human hand, wherein the gear is adapted to ratchetably rotate to move the strand material from the supply source through the groove before exiting the dispenser, and wherein the strand material indentation means are adapted to form visible indentations in the dispensed strand material.

Also provided is a strand material dispenser comprising:

a gear having teeth along a first circumference thereof and cogs along a second circumference thereof, wherein the first circumference is distinct from the second circumference;

a grooved surface having a groove opposing the teeth, wherein the groove is adapted to receive the strand material;

a pawl ratchetably opposing the cogs;

a strand material supply source; and a housing at least partially enclosing the gear, the grooved surface, the pawl and the strand material supply source, wherein the housing is adapted to be held in a human hand, wherein the gear is adapted to ratchetably rotate to move strand material from the supply source through the groove before exiting the dispenser, and wherein the teeth are adapted to form visible indentations in the dispensed strand material.

The invention also provides a method for dispensing a ductile strand material, said method comprising:

providing the ductile strand material having a substantially smooth surface;

providing a dispenser according to the invention;

threading the ductile strand material through a groove in the grooved surface of the dispenser and beneath the gear of the dispenser;

rotating the gear to indent the gear teeth into the ductile strand material, advance the ductile strand material through the groove, and dispense the ductile strand material from the dispenser, wherein the ductile strand material as dispensed has regularly-spaced indentations formed by the gear teeth.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Although this description focuses on employing the invention to dispense solder, which is the most preferred application, the invention is not limited thereto. Dispensers according to the invention are suitable for dispensing any strand material having characteristics similar to solder. Thus, dispensers according to the invention are particularly suitable for dispensing ductile strand materials, more particularly, self-supporting ductile strand materials, such as solder.

Figure 1:
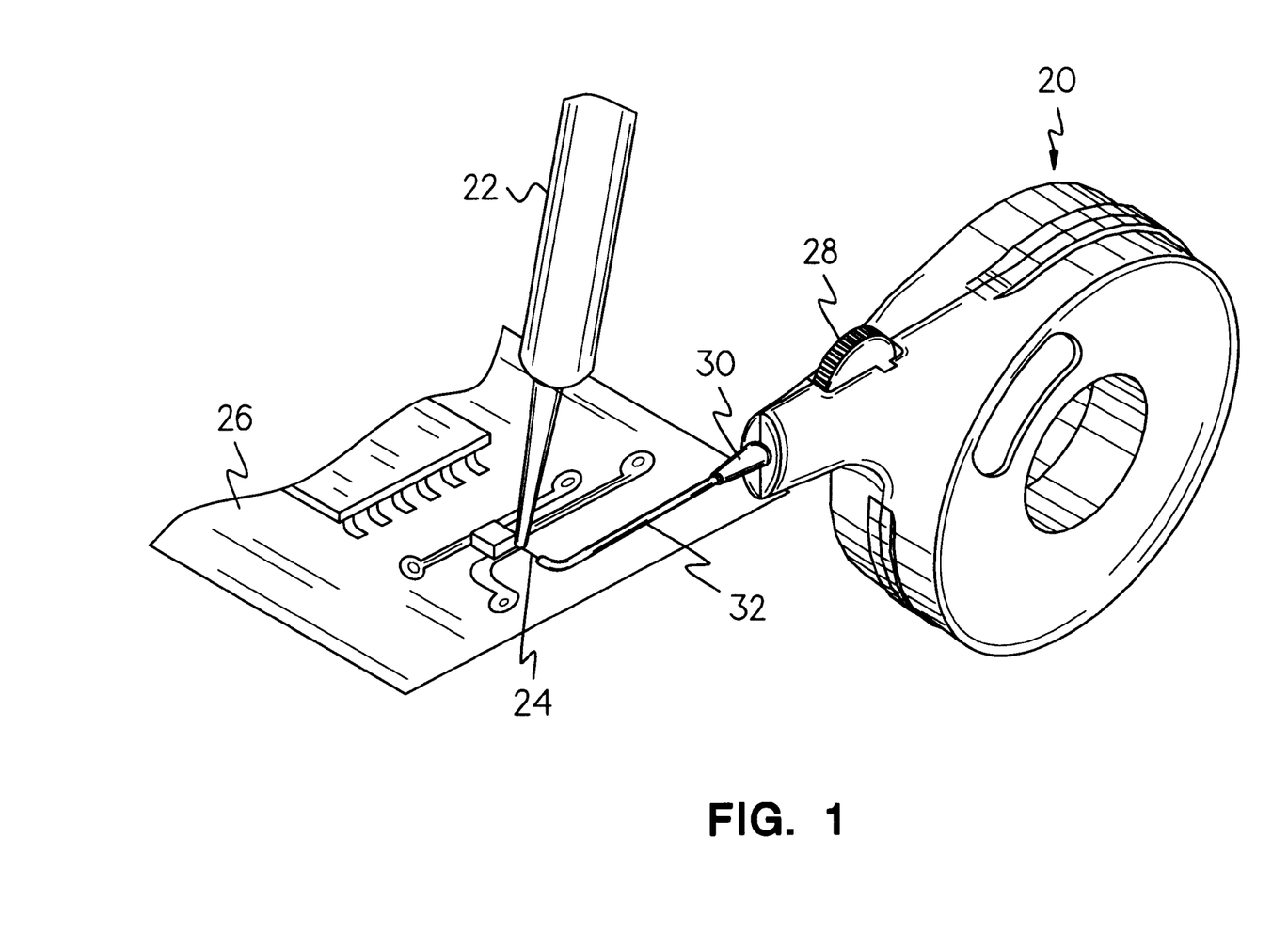
FIG. 1 is a perspective view of an embodiment of a dispenser of the invention being employed in a process of soldering a circuit board.

Referring to FIG. 1, a dispenser 20 according to the invention can be used in conjunction with a soldering iron 22 to apply solder 24 to a circuit board 26. Solder 24 is extruded from dispenser 20 onto circuit board 26 by rotating gear 28 clockwise (with respect to the perspective shown in FIG. 1). Solder 24 is extruded from dispenser 20 through nozzle 30 and nozzle extension 32.

Figure 2:
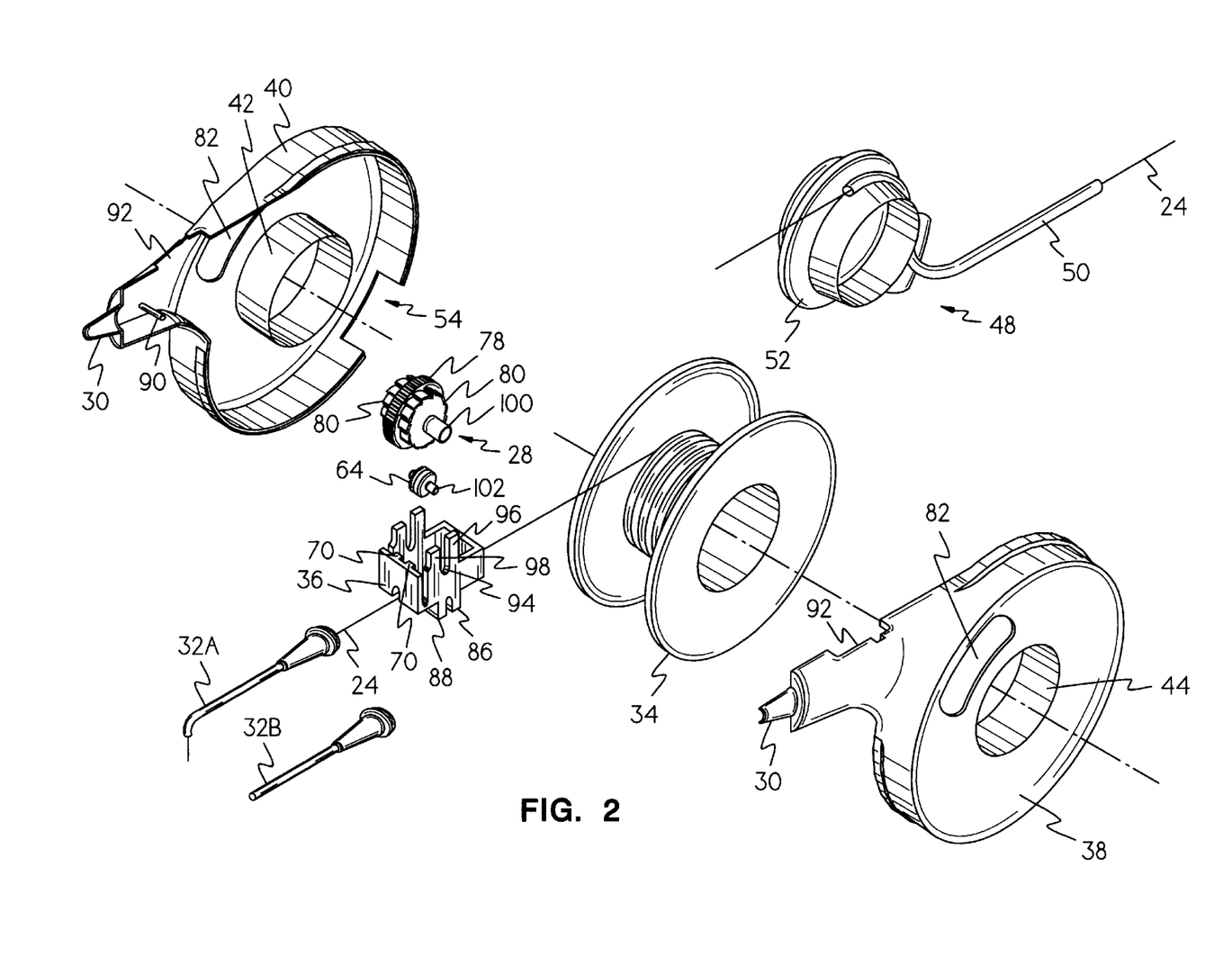
FIG. 2 is a perspective view of components of the dispenser shown in FIG. 1, along with alternative components.

FIG. 2 shows a disassembled dispenser of the invention. The dispenser comprises a spool 34 and a gear holder 36 sandwiched between left shell 38 and right shell 40. Solder 24 is wound around spool 34, with one end passing through gear holder 36, nozzle 30 and optional nozzle extender 32. Spool 34 is rotatably mounted on left axle 42 and right axle 44 when shells 38 and 40 are snapped together.

Alternatively, solder 24 can be stored on an external spool 46 (as shown, e.g., in FIG. 3) and fed into the dispenser through an external spool adapter 48. The external spool adapter 48 of FIG. 2 comprises tube 50 and radial fitting 52. Radial fitting 52 replaces spool 34 within dispenser 20, with a portion of tube 50 being inside dispenser 20 and the balance of tube 50 being outside dispenser 20. Tube 50 passes through shells 38 and 40 via an opening 54. In addition to serving this function, opening 54 enables the user to rapidly assess the amount of solder remaining when an internal spool 34 is used.

FIG. 2 shows alternative nozzle extenders 32A, which is curved, and 32B, which is straight. Curved nozzle extender 32A is particularly suited for dispensing solder or strand material in confined areas, with little clearance for insertion of the dispenser, or any part thereof.

Figure 3:
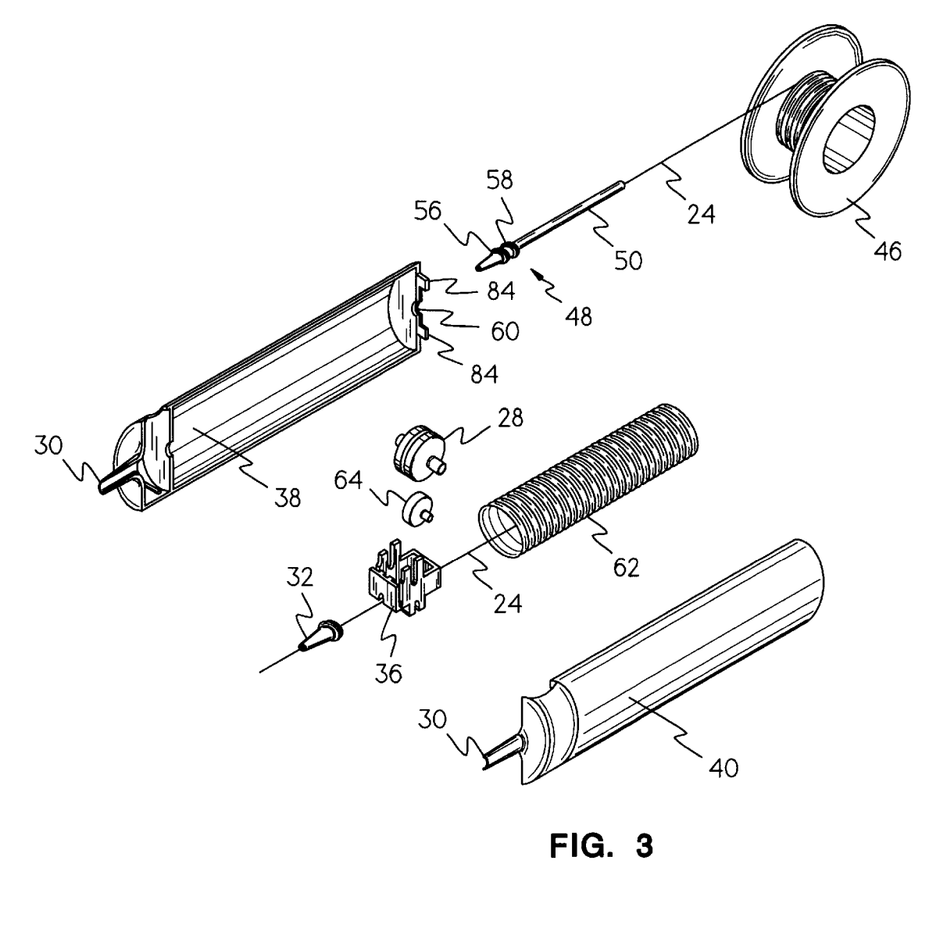
FIG. 3 is a perspective view of components of another embodiment of a dispenser of the invention.
Figure 4:
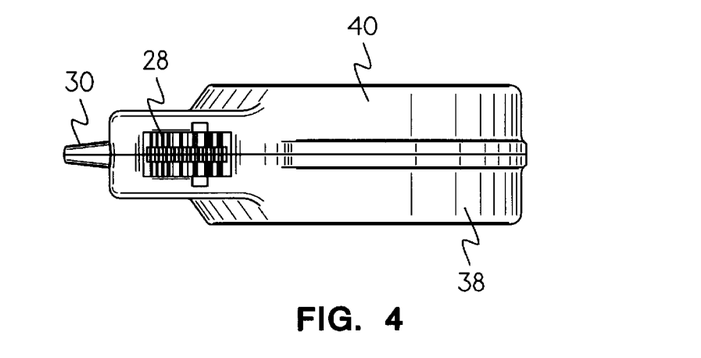
FIG. 4 is an overhead view of the dispenser of FIG. 1.
Figure 5:
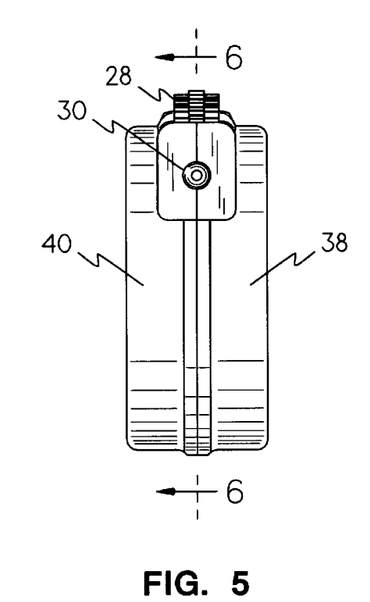
FIG. 5 is a front view of the dispenser of FIG. 1.
Figure 6:
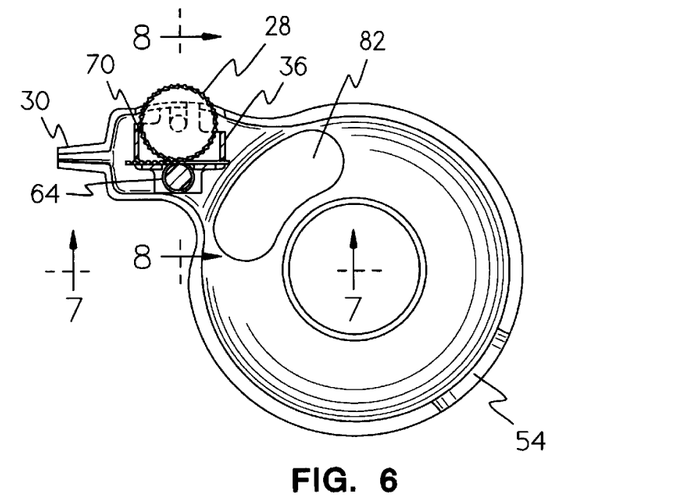
FIG. 6 is a cross-sectional view through line 6—6 of FIG. 5.

Although spool holding dispensers having a partially circular cross-section, such as depicted in FIGS. 1 and 2 (hereinafter referred to as round dispensers), are most preferred, the shape of the dispenser is not limited thereto. For example, dispenser 20 can be cylindrical, as depicted in FIG. 3. As with round dispensers, cylindrical dispensers can be fed solder 24 from an external spool 46 through an external spool adapter 48. Adapter 48 is much simpler in the case of cylindrical dispensers. Adapter 48 comprises tube 50, an internal abutment 56 and an external abutment 58. Adapter 48 is held in place by shells 38 and 40 when they are snapped together with internal abutment 56 inside shells 38 and 40, and external abutment outside shells 38 and 40. Tube 50 passes through shells 38 and 40 via a portal 60 in the solder receiving end of dispenser 20. Abutments 56 and 58 have a diameter larger than portal 60 to facilitate holding adapter 48 in place.

Like round dispensers, cylindrical dispensers can also extrude internally stored strand material. The internally stored strand material can be wound around a dowel (not shown), or preferably, the strand material can be wound about itself to form a helical coil 62 of strand material, as shown in FIG. 3. Solder 24 is first depleted from the end of coil 62 furthest from nozzle 30.

For both round and cylindrical dispensers, the preferred driving means for translating the user's movement into movement of the solder 24 comprises gear 28, gear holder 36 and grooved wheel 64. See FIGS. 8 and 9. Solder 24 passes between gear 28 and grooved wheel 64 mounted in gear holder 36 below gear 28. As gear 28 of FIG. 9 is rotated clockwise by the user (preferably using the thumb of the hand in which dispenser 20 is held), teeth 66 dig into solder 24 to form indentations 68 therein (since the solder or strand material is ductile), and to advance solder 24 out of dispenser 20.

Advancing solder 24 with a toothy surface which creates indentations 68 therein is preferable to advancing the solder with a relatively smooth surface which does not create significant indentations in the solder. First, teeth 66 increase the efficiency of force transfer from gear 28 to solder 24. There is little, if any, chance of slippage between gear 28 and solder 24.

Second, the motion of solder 24 cannot be inadvertently reversed by force generated against the free (i.e., working) end of solder 24. Thus, the user can press the free end of solder 24 against an object to be soldered without jamming the dispenser, or altering the amount of solder 24 dispensed.

Third, by providing gear 28 with regularly spaced apart teeth 66, solder 24 is provided with regularly spaced apart indentations 68, which facilitate applying a regulated amount of solder 24 to an object to be soldered. Thus, teeth 66 essentially convert standard solder 24 into a precisely gauged length of strand material. The volume of solder 24 between indentations 68 can be readily calculated based on the cross-sectional size and shape of solder 24 and the distance between indentations 68. As the distance between indentations 68 is dictated by the distance between teeth 66, the volume of solder 24 between indentations 68 can be adjusted by selecting a gear 28 with the desired intervals between teeth 66. The volume can also be adjusted by selecting an appropriate gauge of solder 24.

FIG. 9 shows gear 28 seated in its solder-engaged position within gear holder 36. In this position, the movement of gear 28 is regulated by ratcheting means comprising pawls 70 and cogs 72. As gear 28 is rotated clockwise by the user, each pawl 70 is elastically deflected outwardly away from gear 28 by sliding up a cog 72 to its peak 74, and then pawl 70 snaps back to meet a base 76 of the next cog 72.

Ratcheted gears have several advantages relative to unratcheted gears. First, the ratcheting means prevents inadvertent reverse movement of gear 28 and solder 24. Second, the ratcheting means facilitates extruding controlled amounts of solder 24 from dispenser 20. Pawl 70 and cogs 72 are preferably formed from materials that provide the user with audible and/or palpable feedback indicating when pawl 70 has traversed a cog 72. The user does not have to lose visual focus on the object being soldered to determine whether sufficient solder 24 has been extruded from dispenser 20.

The number of cogs 72 on gear 28 and the distances between them can be adjusted to vary the length of solder 24 extruded by each ratcheting cycle (i.e., each "click" of the ratcheting means). The ratio of cogs 72 to teeth 66 can also be adjusted as desired to vary the number of indented segments of solder 24 extruded from the dispenser per ratcheting cycle.

Figure 8:
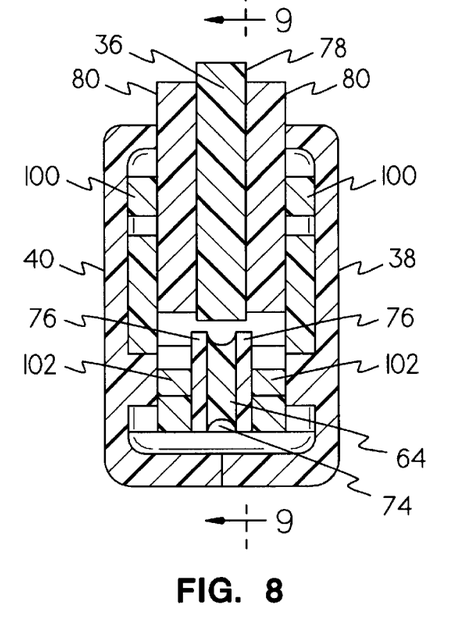
FIG. 8 is a cross-sectional view through line 8—8 of FIG. 6.
Figure 9:
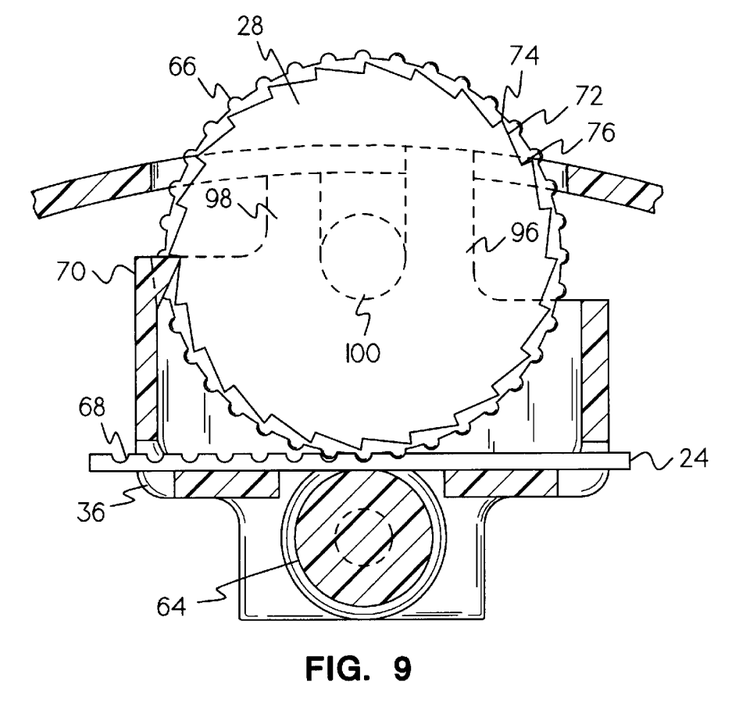
FIG. 9 is a cross-sectional view through line 9—9 of FIG. 8.

As shown in FIG. 8, grooved wheel 64 has an arcuate groove 74 between two ridges 76. Groove 74 is preferably a medial circumferential groove. Wheel 64 is mounted beneath gear 28 such that solder 24 occupies groove 74 as it passes through gear holder 36 between gear 28 and wheel 64 (solder 24 is omitted from FIG. 8 for clarity). Solder 24 is not completely indented or crushed between gear 28 and wheel 64 since at least a portion of solder 24 lies within groove 74, and gear 28 is designed such that it does not completely penetrate into groove 74. For example, the toothy center portion 78 of gear 28 can be made wider than groove 74, ensuring that gear 28 and teeth 66 will not penetrate wheel 64 below ridges 76. The flanking cog containing portions 80 of gear 28 preferably have a smaller diameter than center portion 78, and do not impinge upon solder 24.

In alternative embodiments, the cogs and teeth can be merged into a single element, which functions to ratchet with pawls 70 and indent solder 24.

Although a rotating wheel is most preferred for use in the dispenser 20, a grooved stationary surface (not shown) can be substituted therefor.

Figure 7:
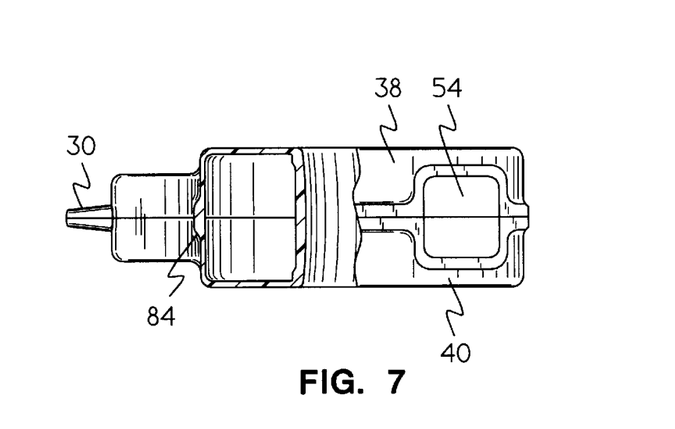
FIG. 7 is a bottom view of the dispenser of FIG. 1, with a partial cross-sectional view through line 7—7 of FIG. 6.
Figure 10:
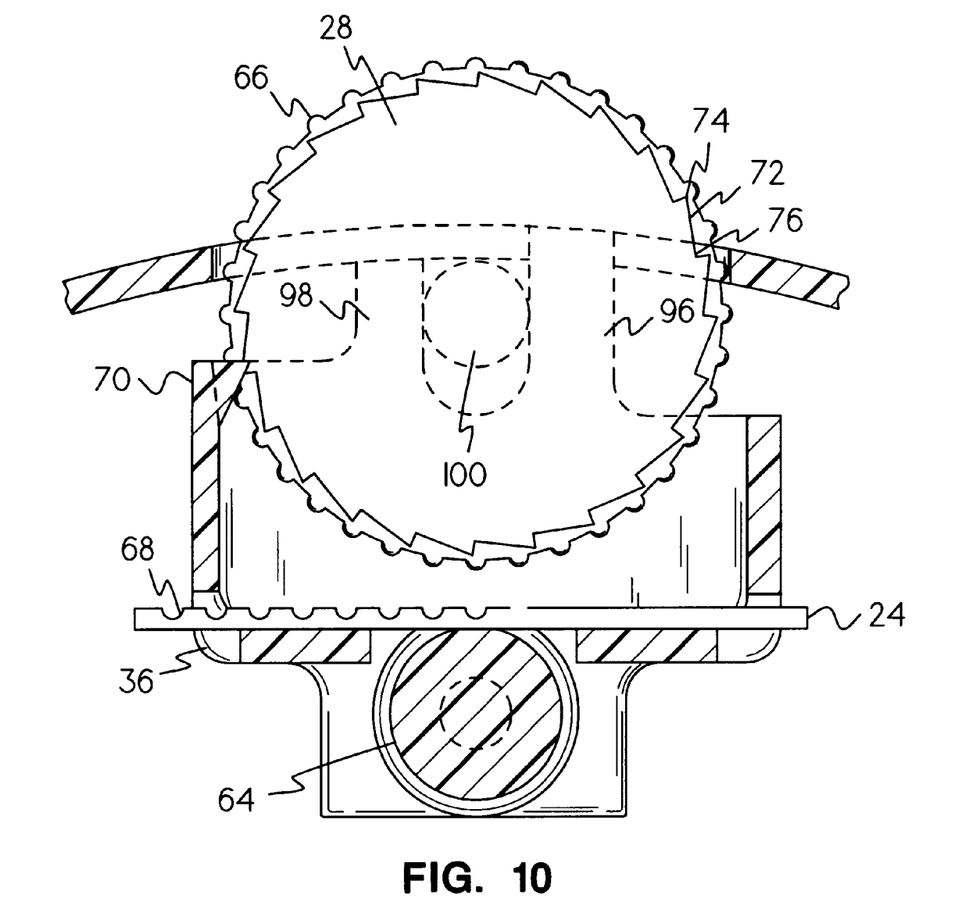
FIG. 10 is a view identical to that of FIG. 9, except that the rotating gear is elevated and disengaged from the strand material.

In addition to the solder-engaged position depicted in FIG. 9, gear 28 can be raised to an elevated position within gear holder 36 by rotating gear 28 counter-clockwise, such that gear 28 pivots on pawl 70 (which is relatively resistant to vertical distortion). In this solder-disengaged position shown in FIG. 10, solder 24 can be moved independently of gear 28. If, for example, the user would like to recoil a length of solder 24, gear 28 can be disengaged from solder 24, and spool 34 can be rotated clockwise to take-up the desired length of solder by simply manipulating spool 34 with a thumb and finger inserted into manual access slots 82 (see FIG. 7).

Moving gear 28 into its disengaged position also facilitates installing and removing spool 34 from dispenser 20. Dispenser 20 can also be operated in the free-wheeling mode with the gear 28 in the position shown in FIG. 10, dispensing solder 24 without indentations 68.

Dispenser 20 can be fabricated from a wide variety of materials. The particular materials selected are dictated by the desired properties of dispenser 20, including its durability, thermal resistance, chemical resistance, cost, weight, appearance, feel, electrical conductivity and disposability. Dispenser 20 can be made from, e.g., metal, alloy, wood and/or synthetic polymer. The various components of dispenser 20 can be made from the same material or from different materials.

Shells 38 and 40 are preferably made from high-impact plastic, which provides dispenser 20 with good durability and impact resistance. At least nozzle 30 should preferably be heat resistant, particularly when dispenser 20 is used for soldering. Of course, any portion of dispenser 20 which contacts solder 24 (or any other strand material being dispensed) should be compatible therewith (i.e., the material should resist being damaged by and resist damaging the chemicals comprising solder 24). Each shell is preferably molded as a unitary piece.

In the embodiment depicted in FIGS. 3–7, shells 38 and 40 are held together by snap tabs 84, which provide frictional and mechanical resistance to being separated; however, the means by which shells 38 and 40 are held together is not particularly limited. In addition to mechanical means, shells 38 and 40 can be held together by other means, including chemical means (e.g., adhesives). When dispenser 20 is intended to be reloadable, shells 38 and 40 are removably held together. When dispenser 20 is not reloadable (i.e., when dispenser 20 is intended to be discarded after its contents of strand material has been depleted), shells 38 and 40 need not be separable.

Gear 28 and grooved wheel 64 are held by gear holder 36 within shells 38 and 40. In the embodiment of FIG. 2, gear holder 36 has two basal fins 86 which define a basal channel 88 therebetween for receiving gear holder supporting tabs 90 projecting from the inside surfaces of shells 38 and 40. When shells 38 and 40 are joined, gear holder 36 is mounted on tabs 90 within gear well 92, such that gear 28 extends above the surfaces of shells 38 and 40.

Gear 28 is slidably engaged within opposing gear channels 94 formed on the left and right sides of gear holder 36 between a major dorsal fin 96 and a minor dorsal fin 98.

As discussed above, in the most preferred embodiment, gear 28 has a toothy center portion 78 flanked by cog containing portions 80. Gear 28 also has gear axles 100 which slidably engage within gear channels 94. Gear 28 can be a unitary piece or it can be a combination of pieces provided that toothy center portion 78 and cog containing portions 80 move in unison and do not move independently of each other.

Gear 28 should be made of a hard material durable enough to withstand repeated ratcheting contact with pawl 70. The material should be compatible with the strand material or solder being dispensed. Suitable materials include metal, alloy, synthetic polymer and wood. When dispenser 20 is intended for dispensing solder, it is preferred that gear 28 be electrically conductive so that undesirable static charge will not build-up, but rather will be dissipated by conduction from solder 24 through gear 28 and the user contacting gear 28. Thus, gear 28 preferably consists of a conductive metal or alloy, or consists of a non-conductive material coated with a conductive material. Suitable non-conductive materials include, but are not limited to: ABC, polycarbonate and acrylics.

Grooved wheel 64 should be made of a material compatible with the strand material or solder being dispensed. Suitable materials include metal, alloy, synthetic polymer and wood. Grooved wheel 64 can be a unitary piece, or it can be formed from a combination of pieces. For example, grooved wheel axles 102, about which or on which grooved wheel 64 rotates, can be formed from a different material than grooved wheel 64.

Gear holder 36 can be formed as a unitary piece or a combination of pieces. It should be made of a material that is durable enough to withstand repeated ratcheting contact with gear 28 (since pawls 70 are preferably an integral part of gear holder 36), is hard enough to maintain its structural integrity under the forces applied by the user, and is elastic enough to repeatedly ratchet pawl 70 into cogs 72. The material should be compatible with the strand material or solder being dispensed. Suitable materials include metal, alloy, synthetic polymer and wood, with synthetic polymers being preferred.

Nozzle extensions 32 are optional, but are preferred for use in cramped environments, in which the balance of dispenser 20 is too bulky to gain access. Nozzle extension 32 should preferably be made of a hard material that is heat resistant. The material should be compatible with the strand material or solder being dispensed. Suitable materials include metal, alloy and synthetic polymer, with metals and alloys being most preferred. The inventor has found that it is most advantageous to provide nozzle 30 with dimensions in accordance with standard syringes so that standard syringe fittings can be used as nozzle extensions 32.

Radial fitting 52 and tube 50 can be formed from the same materials as shells 38 and 40. Tube 50 is preferably flexible and can, e.g., consist of the same materials as a bicycle cable sleeve.

Gear 28, grooved wheel 64 and gear holder 36 can be permanently fixed together to prevent loss, or can be separable. When gear 28 is not permanently fixed to gear holder 36, the diameter of gear 28 should exceed the length of wheel well 92, so that gear 28 will not separate from gear holder 36 and be able to fall out of the shells when the shells 38 and 40 are joined.

While the invention has been described in detail and with reference to specific examples thereof, it will be apparent to one skilled in the art that various changes and modifications can be made therein without departing from the spirit and scope thereof.

What is claimed is:

1. A strand material dispenser comprising:
   a gear having teeth along a first circumference thereof and cogs along a second circumference thereof, wherein said first circumference is distinct from said second circumference;
   a grooved surface having a groove opposing said teeth, wherein said groove is adapted to receive said strand material;
   a pawl ratchetably opposing said cogs;
   a strand material supply source; and
   a housing at least partially enclosing said gear, said grooved surface, said pawl and said strand material supply source, wherein said housing is adapted to be held in a human hand,
   wherein said gear is adapted to ratchetably rotate to move strand material from said supply source through said groove before exiting said dispenser, said teeth are adapted to form visible indentations in said dispensed strand material, and said dispenser is selectively adjustable between two dispensing modes:
      a first dispensing mode, wherein said gear ratchetably rotates to dispense strand material having impressions therein, and
      a second dispensing mode, wherein said gear is disengaged from said strand material, and said strand material can be freely pulled from said dispenser.

2. The strand material dispenser of claim 1, wherein said strand material is solder.

3. The strand material dispenser of claim 1, wherein said dispenser comprises at least one member selected from the group consisting of metal, alloy, synthetic polymer and wood.

4. The strand material dispenser of claim 1, wherein said first circumference is larger than said second circumference.

5. The strand material dispenser of claim 1, wherein there are two said second circumference and two said pawl, said first circumference is flanked by said two second circumferences, one said pawl opposes one said second circumference and another said pawl opposes another said second circumference.

6. The strand material dispenser of claim 1, wherein said grooved surface is a wheel having an medial circumferential groove with an arcuate transverse cross-section.

7. The strand material dispenser of claim 6, wherein said gear cannot completely occupy said groove.

8. The strand material dispenser of claim 1, wherein said groove has an arcuate transverse cross-section.

9. The strand material dispenser of claim 1, wherein said pawl comprises a synthetic polymer.

10. The strand material dispenser of claim 9, wherein said synthetic polymer is an acrylic.

11. The strand material dispenser of claim 1, wherein said strand material supply source is a spool around which said strand material is wound.

12. The strand material dispenser of claim 11, wherein said spool is entirely contained within said housing.

13. The strand material dispenser of claim 11, wherein said spool is replaceable.

14. The strand material dispenser of claim 1, wherein said strand material supply source comprises a helical coil of said strand material entirely contained within said housing.

15. The strand material dispenser of claim 14, wherein said helical coil is wound around a cylindrical dowel.

16. The strand material dispenser of claim 1, wherein said strand material supply source comprises an external spool around which said strand material is wound and a partially external tube which is partially enclosed within said housing and through which said strand material is conveyed from said external spool to said groove.

17. The strand material dispenser of claim 1, wherein the housing is round or cylindrical.

18. The strand material dispenser of claim 1, wherein said gear is adapted to pull said strand material from said supply source and push said strand material out of said dispenser through a nozzle.

19. The strand material dispenser of claim 1, wherein said indentations are regularly displaced.

20. The strand material dispenser of claim 1, wherein said groove is adapted to prevent said teeth from cutting completely through said strand material.

21. The strand material dispenser of claim 1, wherein said gear is electrically conductive.

22. A method for dispensing a ductile strand material, said method comprising:
   providing said ductile strand material having a substantially smooth surface;
   providing a dispenser according to claim 1;
   threading said ductile strand material through said groove in said grooved surface and beneath said gear;
   rotating said gear to indent said teeth into said ductile strand material, advance said ductile strand material through said groove, and dispense said ductile strand material from said dispenser,
   wherein said ductile strand material as dispensed has regularly-spaced indentations formed by said gear teeth.

23. A strand material dispenser comprising:
   a gear having teeth along a first circumference thereof and cogs along two second circumferences flanking said first circumference, wherein said first circumference is distinct from said second circumferences;

a grooved surface having a groove opposing said teeth, wherein said groove is adapted to receive said strand material;

two pawls ratchetably opposing said cogs in each of said second circumferences;

a strand material supply source; and a housing at least partially enclosing said gear, said grooved surface, said pawls and said strand material supply source, wherein said housing is adapted to be held in a human hand, wherein said gear is adapted to ratchetably rotate to move strand material from said supply source through said groove before exiting said dispenser, and said teeth are adapted to form visible indentations in said dispensed strand material.

* * * * *